United States Patent [19]

Novak

[11] Patent Number: 4,856,658

[45] Date of Patent: Aug. 15, 1989

[54] REMOTE CONTROL UNIT HOLDER ASSEMBLY

[76] Inventor: Miloslav Novak, 300 S. 880 East #32, Salt Lake City, Utah 84102

[21] Appl. No.: 186,100

[22] Filed: Apr. 25, 1988

[51] Int. Cl.⁴ .............................................. A47B 65/00
[52] U.S. Cl. ........................................ 211/13; 211/43
[58] Field of Search .................. 211/43, 184, 194, 13, 211/42, 144; 248/448; 316.4; 108/60, 61

[56] References Cited

U.S. PATENT DOCUMENTS

| | | | |
|---|---|---|---|
| 1,969,310 | 8/1934 | Lowrie et al. | 248/316.4 X |
| 2,510,077 | 6/1950 | Coffman | 211/43 X |
| 3,844,415 | 10/1974 | Heimann | 211/43 |
| 4,005,841 | 2/1977 | Rensland et al. | 248/188.7 |
| 4,249,336 | 2/1981 | Moe et al. | 248/448 X |
| 4,496,127 | 1/1985 | Nelson | 211/43 X |
| 4,678,087 | 7/1987 | York | 211/87 |

FOREIGN PATENT DOCUMENTS 538615 3/1957 Canada ................................... 211/43

Primary Examiner—Alvin C. Chin-Shue
Attorney, Agent, or Firm—B. Deon Criddle

[57] ABSTRACT

A holder assembly for remote control units used with television sets, recorders, stereos, home entertainment centers and the like and comprising an adjustably sized control unit holder adapted to be interconnected with other similarly constructed holders.

3 Claims, 2 Drawing Sheets

REMOTE CONTROL UNIT HOLDER ASSEMBLY

BRIEF DESCRIPTION

1. Field of the Invention

This invention relates to devices for holding remote control units commonly used with television sets, recorders, radios, stereos and home entertainment centers and is particularly concerned with a holder that can be readily coupled to other similar holders to thereby provide for organization of the controllers held by the holders.

2. Prior Art

Holders for various articles have been known for many years. Some holders, such as the book holder shown in U.S. Pat. Nos. 1,682,060 and 3,425,565 provide for width adjustments to allow for accomodation of books of different widths.

Other holders are intended to support files, folders, cards, catalogs, journals and other objects commonly found on desk tops and to help on the organization of such objects. U.S. Pat. Nos. 1,750,576, 3,269,547 and 3,844,415, for example, disclose desk top organizers that are compartmentized and expansible to accomodate more or fewer documents and to change relative compartment sizes.

In recent years, remote control devices have been developed to switch on and off and to control tuning of television receivers, VCR units, stereos, home entertainment centers and a myriad of other devices. It is not uncommon with so many devices being remote controlled that the control units become scattered around a room or house or even become lost so that they are not then readily available for use.

To the best of my knowledge, there has not heretofore been developed a holder for remote control units and particularly there has not been a holder assembly that will hold a plurality of remote control units in an organized fashion.

OBJECTS OF THE INVENTION

Principal objects of the present invention are to provide a holder of adjustable size that will fit snugly around a remote control unit and a holder that can be secured to other similarly constructed holders so that a plurality of holders can be held in an organized fashion.

FEATURES OF THE INVENTION

Principal features of the invention include a remote control unit holder having a pair of mating adjustable angle members, each comprising a base leg and a wall leg and means to secure them in interlocked position with a remote control unit resting on the base legs and interior surfaces of the wall legs compressing against the remote controller.

Other features include the provision of mating attachment means on exterior surfaces of the wall legs to permit coupling of similarly constructed holders and an extender provided to increase the width between wall legs, if necessary.

Other objects and features will become apparent to those skilled in the art to which the invention pertains from the following detailed description and drawings.

THE DRAWINGS

In the drawing:

FIG. is a perspective view of a holder of the invention

FIG. 2, a top plan view;

FIG. 3, an end elevation view;

FIG. 4, an end elevation view of a holder assembly of the invention, with three remote control units held by interlocked of holders the invention;

FIG. 5, top plan view of the holder assembly and remote control units of FIG. 4;

FIG. 6, a top plan view of a holder with a width extender attached to an angle member; and FIG. 7 a vertical section, taken on the line 7—7 of FIG. 6.

DETAILED DESCRIPTION

Figure 1:
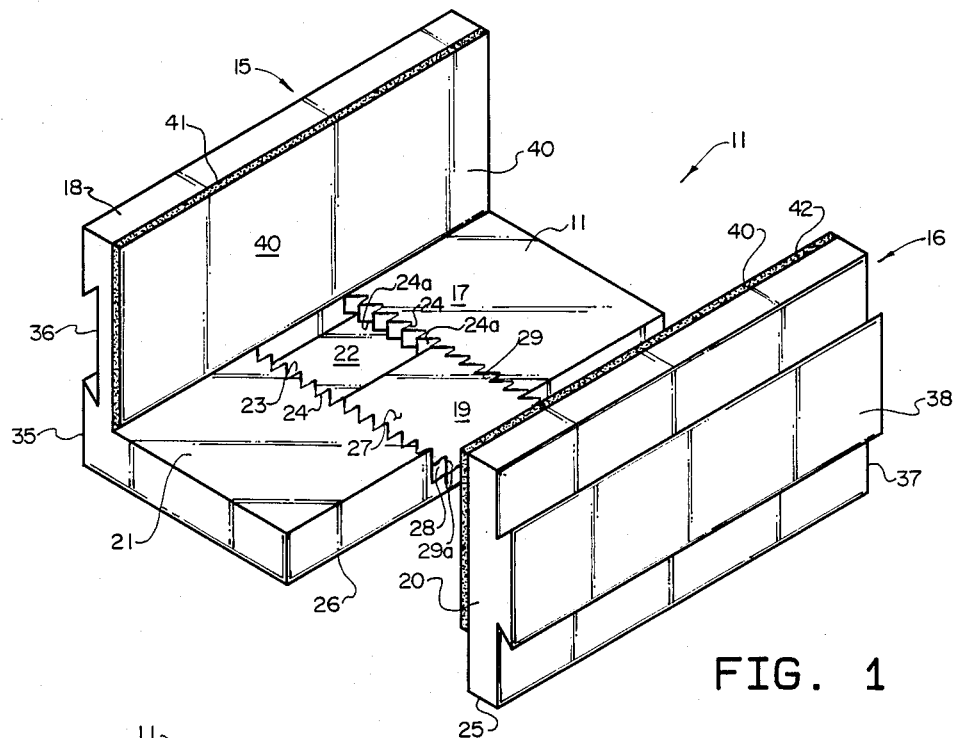
Figures 2, 3:
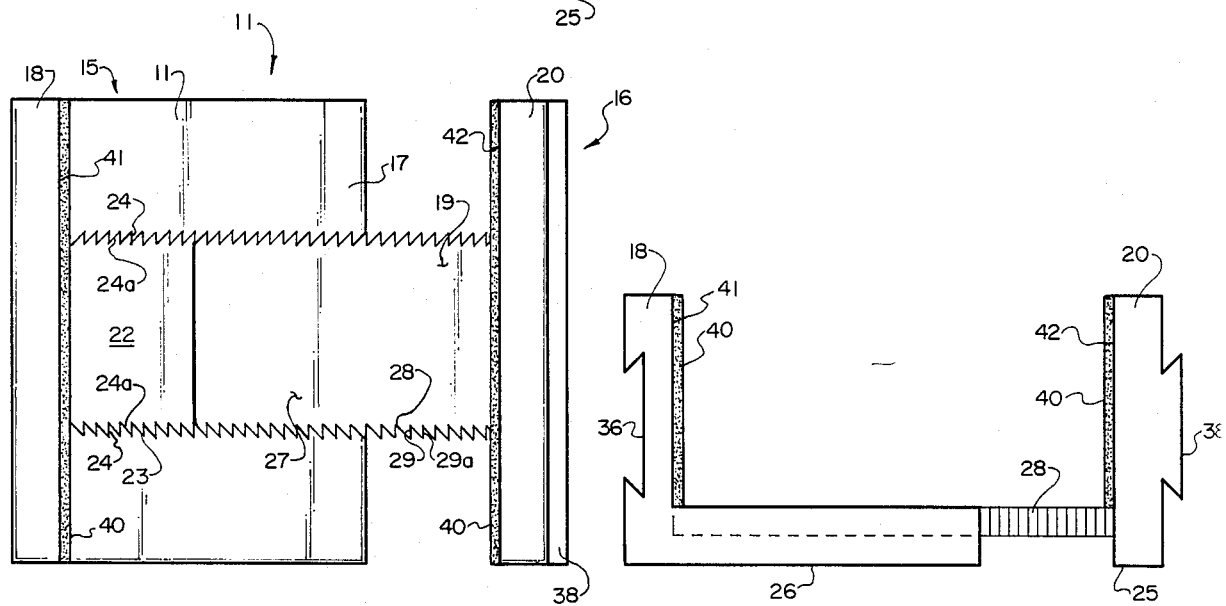
Figure 4:
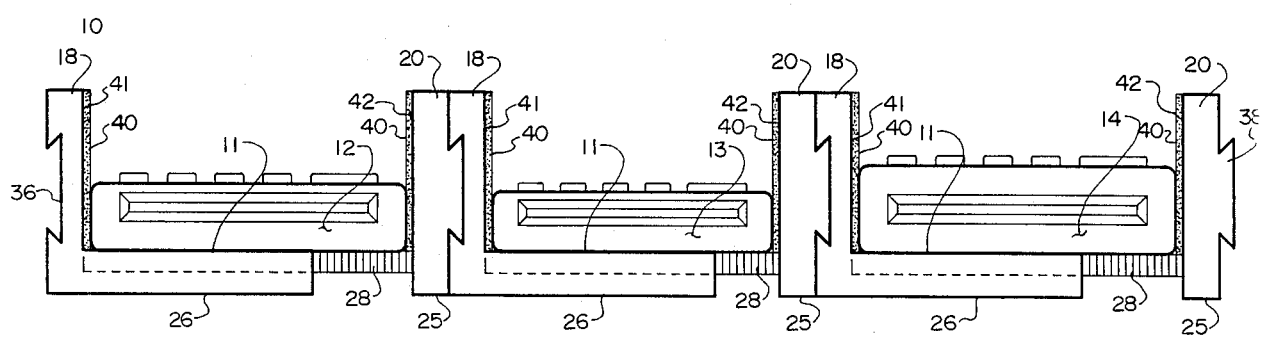
Figure 5:
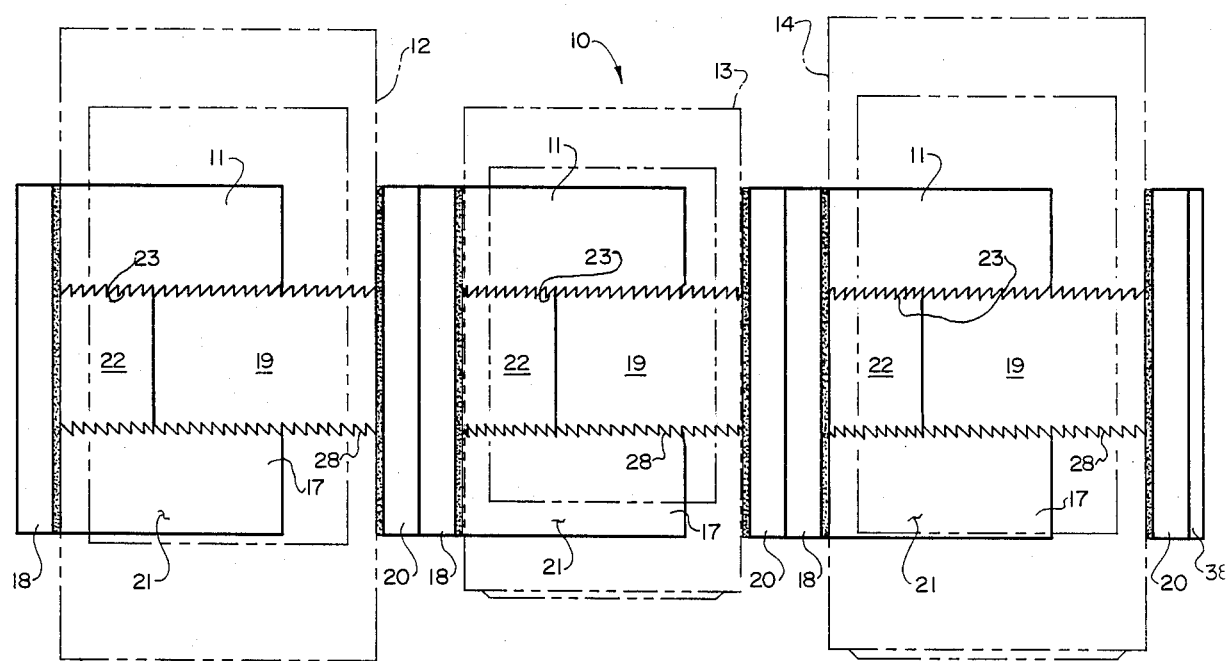
Figure 6:
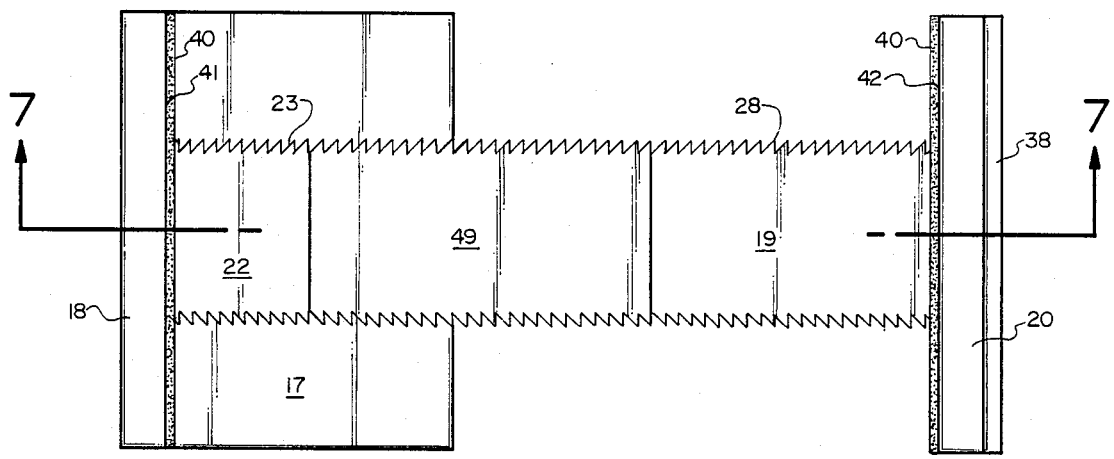
Figure 7:
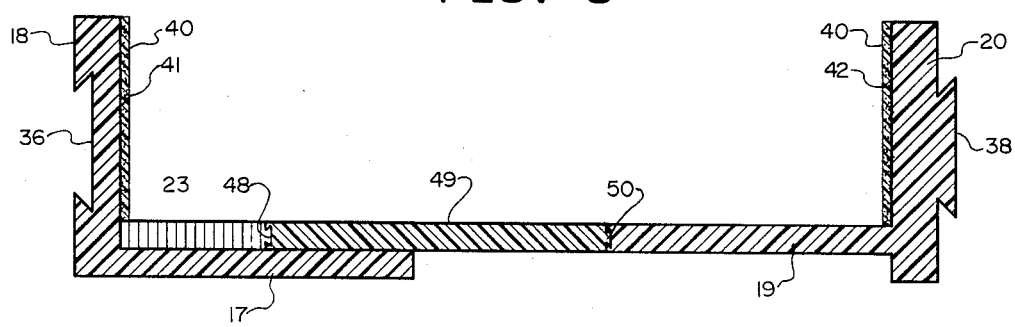

Referring now to the drawings:

In the illustrated preferred embodiment, the holder assembly of the invention, shown generally at 10, FIG. 4, includes a plurality of holders 11 for remote control units which are shown in phantom at 12, 13 and 14.

Each holder 11 includes an angle member 15 and an angle member 16. The angle member 15 includes a base leg 17 and a wall leg 18. Similarly, the angle member 16 includes a base leg 19 and a wall leg 20.

The base leg 17 of angle member 15 has a platform surface 21 that is partially cut away from the top at a central portion 22 and rack teeth 23 are formed along each edge of central portion 22. Each rack tooth has an abrupt shoulder 24 nearest to the wall leg 18 and an angled surface 24a tapering from the outermost portion of the shoulder away from shoulder 24, and inwardly to the edge of central portion 22.

The base leg 19 of angle member 20 projects centrally from an interior surface of wall leg 20 and is spaced above a bottom edge 25 of the angle member so that it will fit into the central portion 22 when the bottom edge 25 is flush with the bottom 26 of the platform surface 21. When the base leg 19 is inserted into central portion 22 a top surface 27 thereof is flush with platform surface 21. Teeth 28 are formed along the projecting edges of base leg 19. Each tooth 28 has a shoulder 29 extending substantially normal to the projecting edge and an angled surface 29a extending from the outermost portion of shoulder 29, away from wall leg 20 and inwardly to the projecting edge. The teeth 28 are adapted to mesh with and to fit inside teeth 23 and the holders are preferably made of plastic or other suitable somewhat resilient material that will allow leg 19 to be inserted end first into central portion 22 and the teeth flexing to allow the angled surfaces 29a to slide past the angled surfaces 24a while withdrawal of the leg 19 is prevented by engagement of shoulders 29 with shoulders 24. It will be apparent however that angle member 16 can be separated from angle member 15, merely by raising base leg 19 out of base leg 17.

An exterior surface 35 of the angle member 15 has a mortise 36 formed therein and an exterior surface 37 of the angle member 15 has a tenon 38 formed thereon. The tenon 38 of one holder 11 is adapted to slide snugly into the mortise 36 of another holder 11. Thus, as many holders 11 may be interlocked, as desired.

A liner 40, made of durable cushion material such as plastic, is provided as a facing for the interior surfaces 41 and 42 of the wall legs 18 and 20, above the base legs 17 and 19.

In use, a remote control unit 12 is positioned on a platform surface 21 of a holder 11 either before or after initial insertion of base leg 19 into central portion 22.

The angle member 16 is then pushed tightly against angle member 15, compressing the liners 40 until matching teeth 23 and 28 prevent separation of the angle members. The liners 40 protect the remote control units from scratches, scuffs and the like.

Additional remote control units such as 13 and 14 are placed in other holders 11 and the various holders 11 are then dovetailed together by sliding the tenon of one holder into the mortise of another.

To provide for accomodation of even unusually wide remote control units the remote end of base leg 19 of angle member 16 may have a mortise 48 formed thereacross. An extension member 49, having the same width, thickness and teeth arrangement in the sides thereof as the base leg 19 has a tenon 50 on one end thereof. The extension member can be dovetailed to the base leg 19 to form a continuation thereof and to accomodate even wider remote control units.

With the present invention, a holder assembly 10 is formed from a plurality of interconnected holders 11 and any desired member of remote control units can be held by a corresponding number of interconnected holders.

Although preferred forms of my invention have been herein disclosed, it is to be understood that the present disclosure is by way of example and that variations are possible without departing from the subject matter coming within the scope of the following claims, which subject matter I regard as my invention.

I claim:

1. A holder for remote control units comprising
    a first angle member having a base leg and a wall leg extending normal to said bas leg, said base leg having a top platform surface and a central recessed portion that is partially cut into said top platform surface of the base leg to extend from the wall leg to a remote end of the base leg and with parallel opposite edges of the recessed portion having a rack of teeth formed thereon and with a portion of the base leg extending between the racks of teeth and below the teeth;
    a second angle member having a second base leg and a second wall leg extending normal to said second base leg, said second base leg having a thickness corresponding to the depth of the central recessed portion whereby an upper surface of said second base leg will form a continuation of the platform surface, and having parallel side edges with a rack of teeth on opposite sides thereof interlocking with the teeth on the edges of the central recessed portion, the teeth of the first and second angle members being resilient and shaped to allow insertion of the second base leg of the second angle member into the central recessed portion while preventing withdrawal therefrom;
    a mortise formed on a rear surface of one of said wall legs;
    a tenon sized to slide snugly into the mortise, formed on a rear surface of the other of said wall legs;
    an extension member having racks of teeth on opposite sides thereof; and
    mean to releasably couple said extension member to the remote end of the base leg of the second angle member, with the teeth on the extension member forming a continuation of the teeth on the base leg of the second angle member.

2. A holder as in claim 1, wherein the extension member and
    the base leg of the second angle member have abutting ends, with a mortise formed on one abutting end and a tenon on the other abutting end fitted into the mortise.

3. A holder assembly comprising
    a plurality of interconnected holders as set forth in claim 7 coupled by fitting of a tenon of one holder into a mortise of an adjacent holder.

* * * * *